United States Patent

[11] 3,622,916

[72] Inventor Tore Torstensson Fjallbrant
Goteborg, Sweden
[21] Appl. No. 13,333
[22] Filed Feb. 24, 1970
[45] Patented Nov. 23, 1971
[73] Assignee Telefonaktiebolaget LM Ericsson
Stockholm, Sweden
[32] Priorities Mar. 11, 1969
[33] Sweden
[31] 3314/69;
Feb. 6, 1970, Sweden, No. 1504/70

[54] PERIODIC FREQUENCY CHARACTERISTIC FILTER FOR FILTERING PERIODIC SAMPLED SIGNAL
5 Claims, 6 Drawing Figs.

[52] U.S. Cl. 333/70 A, 328/167
[51] Int. Cl. H03h 7/10
[50] Field of Search 328/151, 167; 333/29, 70, 70 A, 70 T

[56] References Cited
UNITED STATES PATENTS 3,370,292 2/1968 Deerfield 328/167 X

*Primary Examiner*—Herman Karl Saalbach
*Assistant Examiner*—Paul L. Gensler
*Attorney*—Hane & Baxley

ABSTRACT: A filter has first and second multiinput addition circuits each with a single output wherein one input of the first addition is the input to the filter and the output of the second addition circuit is the output of the filter. The addition circuits are so constructed that the signal received at any input is multiplied by a weighting factor. The output of the first addition circuit is connected to one input of the second addition circuit. A plurality of serially connected delay circuits are also connected between the outlet of the first addition circuit and the inputs of the second addition circuit with the outputs of the delay circuits being connected to respective inputs of the second addition circuit and also to respective inputs of the first addition circuit. The delay of the delay circuits is equal to 1/N times the sampling period, where N is an integer greater than unity so that different transfer functions of the filter can be obtained.

INVENTOR

TORE TORSTENSSON FJÄLLBRANT

BY Hane & Baxley

ATTORNEYS

INVENTOR
TORE TORSTENSSON FJÄLBRANT

BY Hane and Baxley
ATTORNEYS

PERIODIC FREQUENCY CHARACTERISTIC FILTER FOR FILTERING PERIODIC SAMPLED SIGNAL

The present invention relates to a filter with a periodic frequency characteristic intended for filtering of, for example, a periodically sampled signal and consisting of a first and a second addition circuit, each having one outlet and a number of inlets. The addition circuits are so arranged that at the respective outlet there is obtained the sum of the input signals multiplied by a factor associated with each inlet, and one inlet of the first addition circuit constituting the inlet of the filter and the outlet of the second addition circuit constituting its outlet. The outlet of the first addition circuit is connected both to an inlet of the second addition circuit and to the inlet of the first of a number of series-connected delay circuits, the outlets of which are connected each to an inlet of the first addition circuit and to an inlet of the second addition circuit.

In a filter of the type defined above, a so-called combfilter, the filter effect is obtained when to the input signal, which consists of a sampled signal with a given frequency, there are added earlier sampled values multiplied by certain chosen factors. This is achieved by means of delay circuits, having delays equal to the sampling period, and of addition circuits connected thereto with the sampled signal preferentially being added to the filter in digital form, so that the delay circuits may consist of shift registers, which are very much cheaper and more reliable than analog delay circuits. This type of filter is described, for example, in the article "Recent Advances in the Synthesis of Combfilters" (1957 I.R.E. Nat. Conv. Rec., pp. 186–199). As appears from this article, an output signal is obtained only at the point of time when an input signal is fed to the filter. This means that the time between two input signals can be used for the delivery of other signals to the filter, i.e., a number of signals can be filtered in parallel by mutually time-displaced samplings of the signal. The filter can be used, for example, in the time division multiplex systems of telephony or for the reception of radar echoes. In the radar case every target gives rise to an echo recurring with the pulse repetition frequency, and the echoes from different targets are mutually displaced in time. As a rule, one is only interested in echoes received during a given portion of the time between two transmitted radar pulses, for example the later half of this time. Accordingly, output signals are not obtained from the filter during the earlier half of the time. An object of the present invention, therefore, is to achieve a filter of the above-described type, in which an input signal gives rise to an output signal at several points of time within a sampling period, different transfer functions being obtained at the respective points of time, and with which filter, moreover, a greater design freedom can be obtained for the characteristics of the transfer function than with earlier used filters of this type. The characteristics of the invention will be apparent from the subsequent claims.

The invention will be explained in greater detail with reference to the accompanying drawings, in which.

Figure 5:
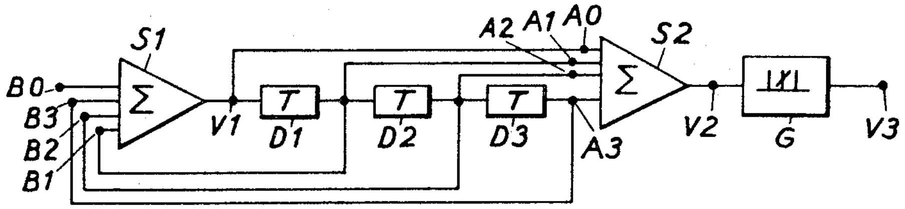

FIG. 5 schematically shows a filter according to the invention, and

Figure 6:
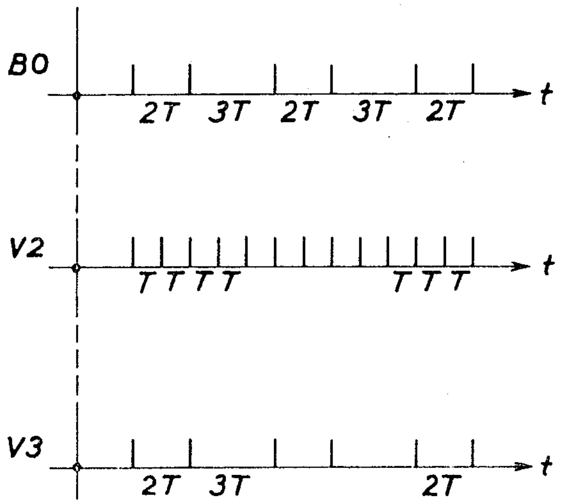

FIG. 6 shows several pulse diagrams for the filter according to FIG. 5.

Figure 1:
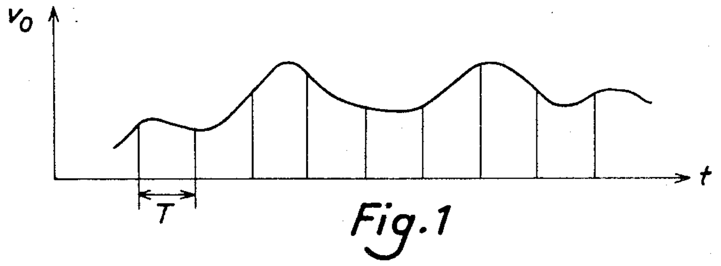
FIG. 1 shows the waveform of a signal $v_0$ sampled at intervals T.
Figure 2:
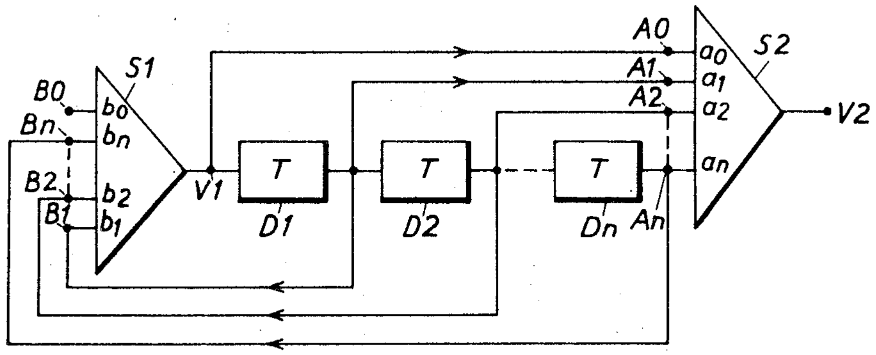
Fig. 2 PRIOR ART
FIG. 2 shows a known filter.

FIG. 1 shows a signal $v_0(t)$ which is assumed to be sampled at intervals T. FIG. 2 shows the known combfilter. This filter consists of two addition units S1 and S2 having outlets V1 and V2 and a number of inlets BO.....B*n* and AO.....A*n* An respectively and is so constructed that the signals fed to the inlets are multiplied by factors $b_0$.....$b_n$ and $a_0$.....$a_n$ respectively, and the sum of the signals so multiplied is obtained at the outlets of the circuit. To the outlet of circuit S1 there is connected a number of series-connected delay circuits D1, D2.....D*n*, the delay of each being equal to the sampling period T. The outlets of the delay circuits as well as the outlet of circuit S1 are connected to inlets of both addition circuits, as will be seen from the figure. Furthermore, the inlet B0 constitutes the inlet of the filter, to which the sampled signal in FIG. 1 is fed, and outlet V2 of circuit S2 constitutes the outlet of the filter, at which the filtered sampled value is obtained. At an arbitrary sampling time the following expressions are obtained for the output signal of the first and second addition unit, respectively, if it is assumed that $b_0=1$:

$$v_1(t)=v_0(t)+b_1v_1(t-T)+b_2v_1(t-2T)+....+b_nv_1(t-nT)$$

$$v_2(t)=a_0v_1(t)+a_1v_1(t-T)+a_2v_1(t-2T)+....+a_nv_1(t-nT)$$

If these equations are Laplace-transformed and the frequency variable $e^{j\omega T}$, where $\omega$ is the frequency, is put equal to $z$, the following expression is obtained (compare the above-mentioned article), noting that the time displacement $T$ implies a multiplication by $1/z$:

$$V_1(Z)=V_0(Z)+\frac{b_1}{Z}V_1(Z)+\frac{b_2}{Z^2}V_1(Z)+\ \ldots\ +\frac{b_n}{Z^n}V_1(Z)$$

$$V_2(Z)=a_0V_1(Z)+\frac{a_1}{Z}V_1(Z)+\frac{a_2}{Z^2}V_1(Z)+\ \ldots\ +\frac{a_n}{Z^n}V_1(Z)$$

which gives $$\frac{V_2(Z)}{V_0(Z)}=\frac{Z^na_0+Z^{n-1}a_1+\ \ldots\ a_n}{Z^n-Z^{n-1}b_1-\ \ldots\ b}$$

From this equation it is apparent that the desired poles and zeros of the transfer function of the filter can be obtained by suitable choice of the factors $a_0$....$a_n$ and $b_1$...$b_n$ respectively. That the transfer characteristic will be periodic is seen from the fact that $z=e^{j\omega t}$, i.e., the conditions at a frequency $\omega_r$ are repeated at the frequencies $\omega=\omega_r+m(2\pi/T)$.

Figure 3:
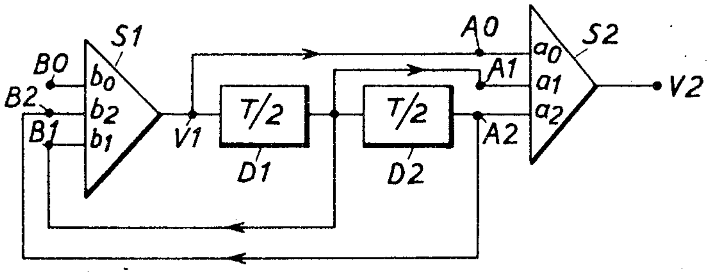
FIG. 3 shows an example of a filter according to the invention.

FIG. 3 shows an example of a filter according to the invention, using the same references for elements identical to the elements in FIG. 2. As appears from FIG. 3 the filter contains two delay units (D1 and D2 respectively) and thus, in respect of the number of delay circuits, is a special case of the filter in FIG. 2. The essential difference is that the delay of the delay units is T/2. As will be readily realized, this will mean that an output signal is obtained both at the sampling times and at time T/2 after each sampling. It will be evident from the calculations below that different transfer functions are realized at the sampling times and at the intermediate times at which an output signal is obtained, and furthermore a greater freedom with respect to the form of the transfer function is obtained through the fact that the factors $b_1$, $b_2$ and $a_0$, $a_1$, $a_2$ are set to given values at the sampling times and to other values at times T/2 later.

In analogy with the equations for the output signals from the filter in FIG. 2 the following equations can be obtained for the filter in FIG. 3 at times $t$, $t$—T/2 and $t$—T, where $t$ is an arbitrary sampling time:

$$t:\begin{cases} v_1(t)=v_0+v_1(t-T/2)b_1+v_1(t-T)b_2 & (1)\\ v_2(t)=v_1(t)a_0+v_1(t-T/2)a_1+v_1(t-T)a_2 & (2)\end{cases}$$

$$t-T/2:\begin{cases} v_1(t-T/2)=0+v_1(t-T)b_1+v_1(t-3T/2)b_2 & (3)\\ v_2(t-T/2)=v_1(t-T/2)a_0 \\ \qquad +v_1(t-T)a_1+v_1(t-3T/2)a_2 & (4)\end{cases}$$

$$t-T:\begin{cases} v_1(t-T)=v_0+v_1(t-3T/2)b_1+v_1(t-2T)b_2 & (5)\\ v_2(t-T)=v_1(t-T)a_0 \\ \qquad +v_1(t-3T/2)a_1+v_1(t-2T)a_2 & (6)\end{cases}$$

To obtain the transfer function at time $t$, equation (3) is first Laplace-transformed, giving in the same way as before:

$$V_{1(t-T/2)}(Z)=\frac{V_{1(t)}(Z)\frac{b_1}{Z}}{1-\frac{b_2}{Z}}=\frac{V_{1(t)}{}^{(Z)b_1}}{Z-b_2}$$

This expression is inserted in equations (1) and (2) after the latter have been correspondingly transformed, giving:

(1)

$$V_{1(t)}(Z)=V_0(Z)+V_{1(t)}(Z)\frac{b_1^2}{Z-b_2}+V_{1(t)}(Z)\frac{1}{Z}b_1$$

(2)

$$V_{2(t)}(Z)=V_{1(t)}(Z)a_0+V_{1(t)}(Z)\frac{a_1b_1}{Z-b_2}+V_{1(t)}(Z)\frac{1}{Z}a_2$$

From these equations the transfer function $V_{2(t)}(Z)/V_0(Z)$ can be solved, giving:

$$\frac{V_{2(t)}(Z)}{V_0(Z)}=\frac{Z^2a_0+Z(a_1b_1+a_2-b_2a_0)-b_2a_2}{Z^2-Z(2b_2+b_1^2)+b_1^2}$$

In the same way the transfer function at time $t$—T/2 can be obtained by first solving $V_{1(t-T/2)}(Z)$ from the Laplace-transformed equation (5) and inserting this value in the Laplace-transformed equations (3) and (4). This gives the following transfer function at time $t$—T/2:

$$\frac{V_{2(t-T/2)}(Z)}{V_0}=\frac{Z[Z(a_1+a_0b_1)-a_1b_2+a_2b_1]}{Z^2-Z(b_1^2+2b_2)+b_2^2}$$

Thus one obtains different transfer functions at the sampling times and at the intermediate times. One may, for example, obtain a stop band for the filter at different frequencies on the two occasions. This can be used, for example, in a so-called Dappler radar receiver in which, due to the Doppler effect, targets with different speeds give rise to echoes having energy contents which lie at different frequencies. Another way of using the filter is, with an extra delay circuit, to delay the first obtained output signal, and, when the next is obtained, to multiply both signals so that a transfer function is obtained with poles and zeros in which one of the two constituent transfer functions has poles and zeros.

It is, of course, also possible periodically to change the values of the factors $b_1$, $b_2$ and $a_0$, $a_1$ and $a_2$ respectively so that they have given values at times $t$, $t$+T.....other values at times $t$+T/2, $t$+3T/2.....If it is assumed that the values at the first-mentioned times are $b_1$, $b_2$ and $a_0$, $a_1$, $a_2$and at the last-mentioned times $b_1'$, $b_2'$ and $a_0'$, $a_1'$, $a_2'$, the following transfer function at time $t$ is obtained from equations 1–6 above by replacing $b_1$, $b_2$ and $a_0$, $a_1$, $a_2$ by $b_1'$, $b_2'$ and $a_0'$, $a_1'$, $a_2'$ in equations (3) and (4) relating to times $t$—$t$/2:

$$\frac{V_{2(t)}(Z)}{V_0}=\frac{Z^2a_0+Z(a_1b_1'+a_2-a_0b_2')-a_2b_2'}{Z^2-Z(b_1b_1'+b_2+b_2')+b_2b_2'}$$

and at time $t$—T/2:

$$\frac{V_{2(t-T/2)}(Z)}{V_0}=\frac{[Z(a_1'+a_0'b_1')-a_1'b_2'+a_2'b_1']}{Z^2-Z(b_1b_1''+b_2+b_2')+b_2b_2'}$$

With this procedure, accordingly, one has a greater freedom concerning the size of the coefficients in the transfer function.

This proves to be usable, for example, for producing a so-called notch filter, i.e., a filter with periodically occuring stop bands. If the coefficients assume the values $a_0=a_0'=1$, $a_1=a_1'=-1$, $a_2=a_2'=1$, $b_1=1$, $b_2=-1+\Delta$, where $\Delta$ is a number $<<1$, and $b_2'=-1$, the following expression is obtained at time $t$ by insertion of these coefficient values in the expression above:

$$\frac{V_{2(t)}}{V_0}=[Z^2+(Z2-b_1')+1]/[Z^2+Z(2-(b_1'+\Delta))+(1+\Delta)]$$

If here $b_1'$ assumes values between 0 and 2, complexly conjugated zeros will be obtained for every value of $b_1'$ in the numerator for Z-values situated on the unit circle in the complex mathematical plane. For example $Z_1=Z_2=-1$ is obtained for $b_1'=2$ and $Z_1=j$ and $Z_2=-j$ for $b_1'=0$, where $j$ is the imaginary unit. When $Z=e^{j\omega T}=j\sin\omega T+\cos\omega T$, accordingly, for $b_1'=Z$ zeros are obtained in the numerator for $\omega=\pi/T+m(2\pi/T)$ and for zeroes $$b_1'=0\downarrow \text{for } \omega=\pm\frac{\pi}{2T}+m\frac{2\pi}{T}$$

Similarly for values of $b_1'$ between 2 and 0, zeros are obtained in the numerators, i.e. stop bands, for frequencies between $\pi/T$ and $\pm(\pi/2T)$ It will also be realized that the Q-value of the filter, i.e., the width of the stop bands, is determined by the number $\Delta$. For, if the numerator differs from zero, the numerator and denominator may be considered to be approximately equal, the accuracy of the approximation, of course, increasing with diminishing value of $\Delta$. One thus obtains a band-stop filter, the cutoff frequency of which can be varied between $\pm(\pi/2T)$ and $\pi/T$ by varying $b_1'$ between 0 and 2, and the Q-value of which is determined by the magnitude of $\Delta$.

Similarly a filter with cutoff frequency between $\pm(\pi/2T)$ and 0 can be achieved by changing the signs for $a_2$ $b_2$ and $b_2'$ and varying $b_1'$ between −2 and 0, whereby the zeros of the numerator will, instead, lie on the part of the unit circle situated in the right-hand half of the complex mathematical plane, i.e., real parts of the zeros will be positive.

Another way of using the filter is to let the value of $b_1$ deviate slightly from the value 1, the pole being slightly angularly displaced in the Z-plane in relation to zero, whereby an arrangement can be obtained which gives a zero output signal for a given frequency, a positive output signal when the frequency increases from this value and a negative output signal when the frequency diminishes. The output signal can in such case be used for acting upon the multiplication factors of the filters in such a way that the cutoff frequency follows the frequency of the input signal.

In conclusion it may be said that the filter shown in FIG. 3 is merely one embodiment of the invention. The number of delay circuits may obviously be greater than two and the delay may be a different fraction than one-half of the sampling period. If the delay is T/N, where N is an integer greater than 1, this means that an input signal will give rise to an output signal N times during every sampling period.

According to another embodiment of the invention the filter is intended for signals, where the time between the pulses is not constant but varies periodically with the time, yet so that each pulse distance is a multiple of the delay of the delay circuits. In addition to these delay circuits and addition circuits the filter furthermore comprises a gate circuit at the outlet side, for passing pulses through at the outlet only to the points of time when a signal pulse is fed to the filter. Moreover the addition circuits are provided with a number of inlets and are constructed so that, at the outlet, there of the respective addition circuit is obtained the sum of the input signals multiplied by a factor related to each inlet. These factors, as regards the addition circuit at the inlet side of the filter, being varied in a predetermined way, so that for all pulse intervals the expression $b^t$ is constant, in which expression reference $b$ is the value of a factor and reference $t$ is the length of a pulse interval, which length may thus vary from a pulse interval to another.

In filters of the type defined above the filter effect is obtained by adding to the input signal earlier sampled values multiplied by certain chosen factors. This is achieved with the aid of the delay circuits and the addition circuits, the sampled signal preferentially being added to the filter in digital form, so that the delay circuits may consist of shift registers, which are very much cheaper and more reliable than analog delay circuits. The filter can be used, for example, in time multiplex systems within the telephony or for the reception of radar echoes.

Figure 4:
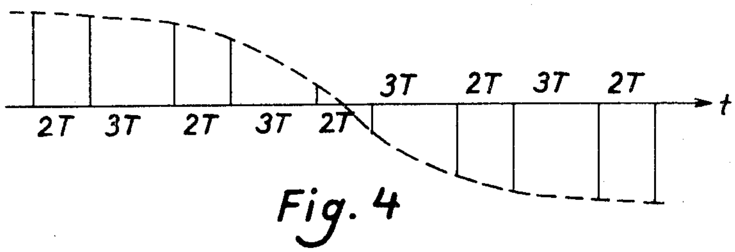
FIG. 4 shows the waveform of a sampled signal.

FIG. 4 is an example of a periodically varying sampling of a signal (dashed line), the pulse distance between the pulses being alternately 2T and 3T. These pulses are intended to be fed at the input terminal BO of a filter, see FIG. 5.

The filter according to FIG. 5 has an addition circuit S1 at the inlet side, three intermediate delay circuits D1, D2 and D3, an addition circuit S2 and a gate circuit G at the outlet side. The addition circuit S1 has a number of inlets B0, B1, B2 and B3, of which the inlet BO is the inlet of the whole filter and the inlets B1, B2 and B3 are connected to the outlets of the respective delay circuits D1, D2, D3. Each of the inlets B1, B2 and B3 is associated with a multiplying factor $b_1$, $b_2$ and $b_3$, and these factors vary in dependence of the length $t$ of the pulse interval between the pulses so that $b^t$ is a constant from one pulse interval to another. If, thus, for example, the factor $b_1$ has the value $b_1=b'$ within pulse intervals of the length 2T and the value $b_1=b''$ within pulse intervals of the length 3T, see FIG. 4, the relationship will be $(b')^2=(b'')^3$. The outlets of the delay circuits D1, D2 and D3 are furthermore connected to their respective inlets at the addition circuit S2, namely the inlets A1, A2 and A3. Each of these inlets is associated with a multiplying factor $a_1$, $a_2$ and $a_3$, which factors do not vary as the factors $b_1$, $b_2$ and $b_3$, but are constant.

At the outlet side of the addition circuit S2 a gate circuit G is arranged, which passes output signals in synchronism with the feeding of the pulses fed to the outlet BO of the addition circuit S1.

FIG. 6 shows some pulse position diagrams of pulses occurring at the inlet BO of the addition circuit S1, at the outlet V2 of the addition circuit S2 and at the outlet V3 of the gate circuit G. As can be seen from the diagrams the pulses at the inlet BO and the outlet V3 occur in synchronism with periodically varying pulse intervals, while the pulses at the outlet V2 occur equidistantly.

It can be mathematically shown that, by using the mentioned variation of the factors b, any desirable amplitude modulation of the pulses transferred through the filter is avoided. The sampling character of the signal is maintained at the outlet of the filter and there is no distortion.

We claim:

1. Filter, intended for filtering of a sampled signal, consisting of a first and a second addition circuit (S1 and S2 respectively) each having an outlet (V1 and V2 respectively) and a number of inlets (B0, B1, B2......and A0, A1, A2......respectively) and so constructed that at the respective outlet is obtained the sum of the input signals multiplied by a factor ($b_1$, $b_2$......and $a_0$, $a_1$, $a_2$ respectively) associated with each inlet, one inlet (B0) of the first addition circuit constituting the inlet of the filter and the outlet of the second addition circuit constitute its outlet, and the outlet of the first addition circuit being connected both to an inlet (A0) of the second addition circuit and to the inlet of the first of a number of series-connected delay circuits (D1, D2.....), the outlets of which are connected each to an inlet of the first and an inlet of the second addition circuit (B1, A1.....and B2, A2......respectively), characterized in that the delay of the delay circuits is equal to 1/N times the sampling period, where N is an integer greater than 1, whereby it is achieved that every input signal gives rise to an output signal at N points of time during the sampling period, and that, for each of these output signals, different transfer functions of the filter can be obtained.

2. Filter according to claim 1, intended for filtering of a signal sampled with periodically varying pulse intervals, characterized in that the multiplying factors ($b_1$, $b_2$....) of the first addition circuit (S1) vary in dependence of the length ($t$) of the pulse interval between the pulses, so that $b^t$ is constant from one pulse interval to another, $b$ being the value of multiplying factor and $t$ being the time between two pulses in a pulse interval, and that at the outlet side of the second addition circuit (S2) there is a gate circuit (G) arranged to pass output signals in synchronism with the feeding of the pulses to the inlet of the first addition circuit (S1).

3. Filter according to claim 1, characterized in that the said factors are preset to different values at the said N points of time.

4. Filter according to claim 3, for filtering a signal sampled with the period T, characterized in that the number of delay circuits is two, $N=2$, the multiplication factor ($a_0$) of the inlet of the second addition circuit, which is connected to the outlet of the first addition circuit, is 1, the multiplication factor ($a_1$) of the inlet of the second addition circuit, which is connected to the outlet of the first delay circuit, is −1, the multiplication factor ($b_1$) of the inlet of the first addition circuit, which is connected to the outlet of the first delay circuit, at the sampling times, is 1 and at points of time which occur at time $T/2$ after these times has a value which may be varied between 0 and 2, and that the multiplication factor ($a_2$) of the inlet of the second addition circuit, which is connected to the outlet of the second delay circuit, is 1, and the multiplication factor ($b_2$) of the inlet of the first addition circuit, which is connected to the outlet of the second delay circuit, is $-1+\Delta$ at the sampling times and −1 at the points of time which occur time T/2 after these times, whereby a band-stop filter is obtained the cutoff frequency of which is determined by said variable value and the width of the stop band is determined by the number Δ.

5. Filter according to claim 3, characterized in that the number of delay circuits is two, $N=2$, the multiplication factor ($a_0$) of the inlet of the second addition circuit, which is connected to the outlet of the first addition circuit, is 1, the multiplication factor ($a_1$) of the inlet of the second addition circuit, which is connected to the outlet of the first delay circuit, is −1, the multiplication factor ($b_1$) of the inlet of the first addition circuit, which is connected to the outlet of the first delay circuit at the sampling times, is 1 and at points of time which occur at T/2 after these times has a value which may be varied between 0 and −2, and that the multiplication factor ($a_2$) of the inlet of the second addition circuit, which is connected to the outlet of the second delay circuit is −1, and the multiplication factor ($b_2$) of the inlet of the first addition circuit, which is connected to the outlet of the second delay circuit, is $1-\Delta$ at the sampling times and 1 at the points of time which occur time T/2 after these times, whereby a band-stop filter is obtained, the cutoff frequency of which is determined by said variable value and the width of the stop band is determined by the number Δ.

* * * * *